United States Patent [19]

Kawazoe

[11] 4,445,767

[45] May 1, 1984

[54] FOCUS DETECTING CAMERA

[75] Inventor: Mitsuo Kawazoe, Hachioji, Japan

[73] Assignee: Olympus Optical Company Ltd., Japan

[21] Appl. No.: 457,379

[22] Filed: Jan. 12, 1983

[30] Foreign Application Priority Data

Apr. 30, 1982 [JP] Japan .............................. 57-63170[U]

[51] Int. Cl.³ ............................................ G03B 13/02
[52] U.S. Cl. .................................. 354/195.1; 354/266
[58] Field of Search ...................... 354/25 R, 266, 195

[56] References Cited

U.S. PATENT DOCUMENTS 4,319,820  3/1982  Ostrowski et al. .................. 354/266

FOREIGN PATENT DOCUMENTS 56-55820  5/1981  Japan .

Primary Examiner—Russell E. Adams
Attorney, Agent, or Firm—Ostrolenk, Faber, Gerb & Soffen

[57] ABSTRACT

A focus detecting camera comprises a switching circuit for an automatic release which is operated in response to an in-focus detection signal, a shutter release button mechanism which is capable of maintaining a partially depressed condition of a shutter release button and an automatic release switch which is brought into operation prior to a shutter release operation, in cooperation with said shutter release button mechanism. Under the condition in which the automatic release switch is in operation with the release button partially depressed, the shutter release is performed by activation of the automatic release switching circuit in response to an in-focus detection signal which is detected when a moving object being photographed reaches a preset distance position.

13 Claims, 13 Drawing Figures

FOCUS DETECTING CAMERA

BACKGROUND OF THE INVENTION

The present invention relates to a focus detecting camera, and more particularly, to a focus detecting camera which automatically detects the in-focus condition when a moving object being photographed reaches a position at a preset distance from the camera position.

As is well known, a conventional camera with an automatic focus detector such as a single lens reflex camera with an automatic focus detector is constructed as shown in FIG. 1. Specifically such a camera includes a movable reflex mirror 1, a taking lens 2, a focusing screen 3, a pentagonal prism 4, a total reflection prism 5 and a photoelectric transducer element 6 for focus detection. The movable mirror 1 is normally inclined at 45° to the optical axis for photographing and is raised outside of the optical axis during photographing. Light transmitted through the taking lens 2 is reflected by the movable mirror 1 to reach an eyepiece window of a view finder (not shown) through the focusing screen 3, the pentagonal prism 4 and so on, thereby an object image being observed from the eyepiece window. The central part of the movable mirror 1 forms a semitransparent portion 1a behind which the total reflection mirror 5 is disposed. Light transmitted through the semitransparent portion 1a is reflected downward by the total reflection mirror 5 which is disposed backwardly of the portion 1a to impinge upon the transducer element 6 which is disposed downwardly of the optical path so as not to intercept it and in the position conjugate with a film 7. In such an arrangement of single lens reflex cameras, a properly focused picture of an object may be obtained on the film surface 7 by moving the taking lens 2 back and forth so that the amount of light incident upon the transducer element 6 is maximized.

With the focus detecting camera described above, a focus detection operation is conventionally performed by moving a taking lens back and forth with a motor until an in-focus condition is met. Once the in-focus condition is met, the shutter of the camera is automatically released. Although this procedure is highly satisfactory for taking a picture of a stationary object, it is often unsatisfactory when taking a picture of a moving object since more time is needed to move the taking lens to its focused position and it is difficult for the taking lens to follow a rapidly moving object. Hence, it is practically impossible to obtain a precise focusing, with the result that a desired picture may be missed.

Therefore, when taking a picture of a moving object with a conventional camera of this type, the user normally employed a normal photographing procedure in which the camera switches the camera to its manual operation so as not to move the taking lens by the automatic focusing circuit. Rather, the desired distance of the object is preset manually and the shutter is released manually when the moving object reaches the preset distance. However, this procedure is extremely inaccurate because of the need to make an estimate of the object distance. In addition, it is necessary for the above conventional camera to provide a mechanism for delivering the drive power of a motor and so on to a taking lens. As a result, the camera must be of a larger size and weight. Also, when the procedure is applied to a camera with interchangeable lenses, for example a single lens reflex camera, it is necessary to provide means for delivering the drive power for all interchangeable lenses associated with the camera. This makes the camera system disadvantageously expensive.

The difficulty in operation and the inaccuracy in focusing as described above are common to cameras with a focus detection mechanism consisting of the trigonometrical range finding mechanism. Particularly when taking pictures of wandering children, ecological pictures of moving animals or the like, great skill is required. In the latter case, it is common to use a camera apparatus employing infrared rays that automatically release the camera shutter when animals break through the infrared rays. This requires a large scale infrared ray apparatus and besides it is impossible to take a picture in an accurate in-focus condition because an object distance varies depending upon a position where an animal breaks through the infrared rays.

To overcome many of the foregoing problems, the inventor has already provided a focus detecting camera in which the shutter is automatically released by an automatic focus detection circuit when a moving object reaches a preset distance position. However, this focus detecting camera has a switch for switching between an automatic release and a manual release mode of operation. At the time of automatic release where a shutter is released in response to a focus detection signal, it is necessary to operate the switch. Such switching operation is troublesome and is is easy to forget. As a result, there are frequent occasions when preparation for taking a picture is not completed in time to take a picture of a rapidly moving object and the chance for a desired picture is lost.

With a conventional camera of the electromagnetic release type, a shutter release button is, by way of example, generally constructed as illustrated in FIG. 2. Specifically, a shutter release button 9 is controlled by a stopper (not shown) while biased upwardly by the resilience force of a coiled spring 11 interposed between a flange portion 9a of the shutter release button 9 and a stationary member 10 within a camera body 8. A switch 12 for a normally open electromagnetic release is disposed under the shutter release button 9. Accordingly, when the shutter release button 9 is depressed against the resilience force of the coiled spring 11, the release portion 9b depresses the movable contact piece of the switch 12 to close it. This causes a shutter to be released by placing a release mechanism into operation under activation of a shutter release circuit (not shown). Therefore, assuming that a changeover switch to be operated for an automatic release is provided on the camera, it would be generally arranged independently of the shutter release button 9 without cooperating therewith. When so arranged, operation of the a changeover switch is troublesome. Therefore, if an automatic release as well as a normal release is performed in cooperation with the operation of a shutter release button, the troublesomeness of the operation at the time of the automatic release as described above could be resolved.

SUMMARY OF THE INVENTION

In view of the foregoing, it is an object of the present invention to provide a focus detecting camera in which a switch for an automatic release is provided so that it is brought into operation in cooperation with operation of a shutter release button, prior to a shutter release operation using the shutter release button and while the switch for an automatic release is in operation the shutter release is automatically performed by detecting the in-focus condition when an object being photographed reaches a preset distance position.

According to the invention, it is possible to take a picture by automatic focusing when a moving object reaches a preset distance position while only keeping a partially depressed condition. This makes it possible to avoid the use of a changeover switch for switching from a photographing operation with a normal shutter release and also makes it possible to take pictures of natural figures of wandering children, modes of life of animals or the like under the in-focus condition in a simple and accurate manner without missing the chance for desired shots and without troublesome operations.

DESCRIPTION OF PREFERRED EMBODIMENTS

Figure 3:
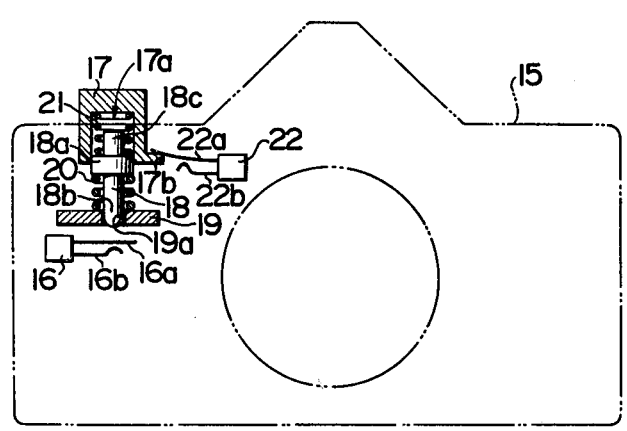
FIG. 3 is a sectional view illustrating structure including a shutter release button and its surroundings of a focus detecting camera according to one embodiment of the invention.

Referring to FIG. 3, there is shown a sectional view of the essential parts of a focus detecting camera according to one embodiment of the invention. Specifically, the focus detecting camera, which is also a camera of the electromagnetic release type, has a normally-open switch 16 for an electromagnetic release which is disposed in place within a camera body 15. A release member 18, which is operated by a shutter release button 17, is disposed over the switch 16. The release member 18 has a flange portion 18a and is biased upwardly by the resilience of a first coiled spring 20 interposed between the lower surface of the flange portion 18a and a stationary member 19. A release portion 18b of the release member 18 which is formed perpendicularly to the lower surface of the flange portion 18a passes through a through-hole 19a of the stationary member 19, the end of which is opposed to a movable contact piece 16a of the switch 16. The shutter release button 17 is in the cup-shaped form within the inner cavity 17a of which the flange portion 18a of the release member 18 is fitted. On the central upper surface of the flange portion 18a, a projection 18c is formed which determines the extent of depression of the shutter release button 17 relative to the release member 18. A second coiled spring 21 is interposed between the upper surface of the flange portion 18a and the upper bottom surface of the inner cavity 17a. As a result, the shutter release button 17 is biased upwardly against the release member 18. The release member 18 and the shutter release button 17, which are biased upwardly by the springs 20 and 21, respectively, are inhibited from moving upward in excess of a given distance by stoppers (not shown) under their free conditions as shown in FIG. 3, respectively. The resilience forces of the first and the second coiled springs 20 and 21 are set so that the latter spring is weaker than the former.

The shutter release button 17 has a protrusion 17b formed at a part of the lower periphery thereof. The protrusion 17b is for locking the tip of a movable contact piece 22a of a normally-closed switch 22 for an automatic release which is disposed within the camera body 15. When the shutter release button 17 is in its uppermost position as shown in FIG. 3, the protrusion 17b also is in the raised position so that the tip of the contact piece 22a is pushed up by the upper surface of the protrusion 17b. As a result, the switch 22 is under the open condition with the contact piece 22a separated from a fixed contact piece 22b.

Figure 4:
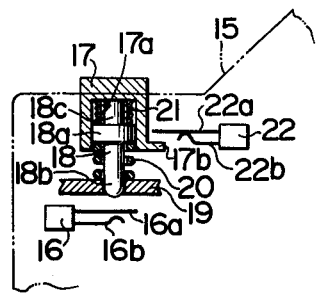
FIG. 4 is a sectional view of a shutter release button in FIG. 3 under its partially depressed condition.
Figure 5:
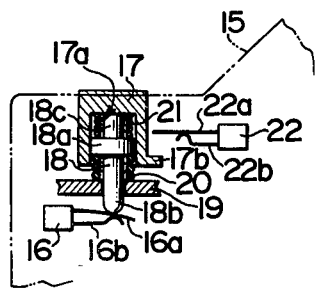
FIG. 5 is a sectional view of the shutter release button in FIG. 3 under its full-stroke depressed condition.

When the shutter release button 17 is depressed, at first the first spring 20 is not compressed but only the second spring 21 is compressed since the resilience force of the latter is weaker than that of the former. Consequently only the shutter release button 17 descends as shown in FIG. 4. Due to the descent of the shutter release button 17, the movable contact piece 22a which has been locked by the protrusion 17b descends by its restoring force together with the protrusion 17b to make contact with the fixed contact piece 22b. By further depression of the shutter release button 17, the upper bottom surface of the inner cavity 17a is brought into abutting relationship against the end of protrusion 18c and thereafter the release member 18 is lowered integrally with the shutter release button 17 with the first spring 20 compressing as shown in FIG. 5. When the release member 18 is lowered against the upward biasing force of the spring 20 to abut the movable contact piece 16a of the switch 16, the contact piece 16a is depressed by the release member 18 to make contact with the fixed contact piece 16b. Thus, when operating the shutter release button 17 to bring it into the partially depressing condition, only the switch 22 is closed as only the shutter release button 17 descends as shown in FIG. 4. When further depressing the shutter release button 17 through its full stroke, the switch 16 for an electromagnetic release is closed as the release member 18 descends as shown in FIG. 5.

Figure 1:
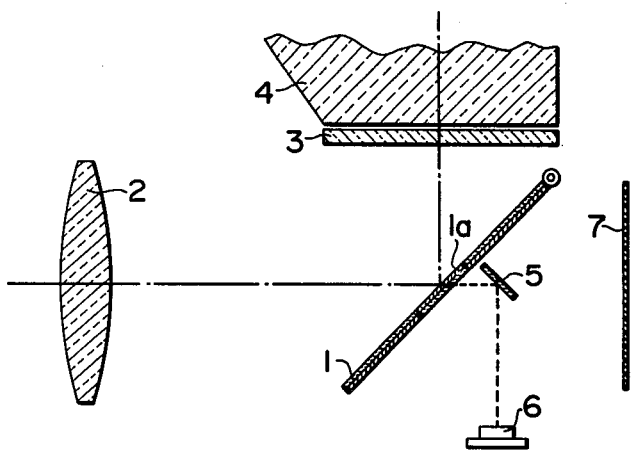
FIG. 1 is a sectional view of focus detecting members in a prior art focus detecting camera.
Figure 2:
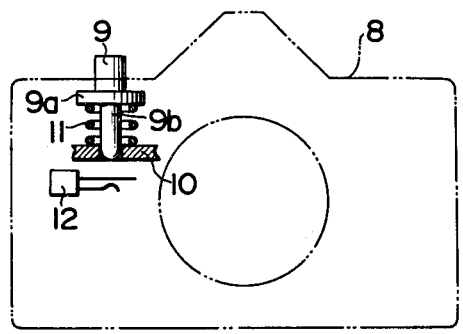
FIG. 2 is a sectional view illustrating an example of structure including a shutter release button and its surroundings of a conventional focus detecting camera.
Figure 6:
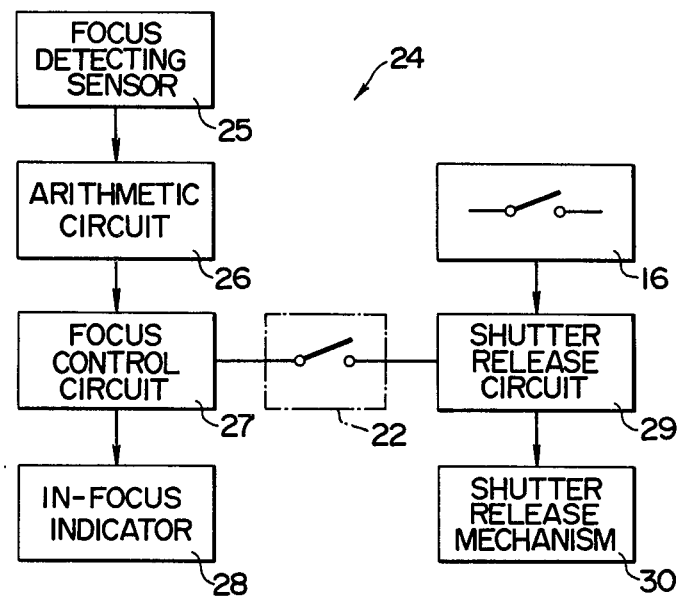
FIG. 6 is a block diagram illustrating structure and actions of the focus detecting camera in FIG. 3.

In FIG. 6, which is a block diagram illustrating construction of the focus detecting camera including the switch 22 and the switch 16 for an electromagnetic release, a sensor 25 for focus detection is composed of photosensitive elements for measuring a distance which corresponds to the photoelectric element 6 in FIG. 1. The output of sensor 25 is applied to a well known arithmetic circuit 26 the output of which is led to a well known focus control circuit 27. The focus control circuit 27 is brought into operation in response to the output of the arithmetic circuit 26 to generate an in-focus signal when the in-focus condition is obtained. An in-focus indicator 28, which includes an LED (light emitting diode) or the like, receives the in-focus signal from the focus control circuit 27 to display the in-focus condition by lighting the LED. As such, a focus detector 24 comprises the focus detection sensor 25, arithmetic circuit 26, focus control circuit 27 and in-focus indicator 28.

In addition, the electromagnetic release switch 16 which is closed by depression of the shutter release button 17 is connected to a well known shutter release circuit 29 and likewise the switch 22 is connected between the focus control circuit 27 and the shutter release circuit 29. Specifically, the switch 22 when closed places the shutter release circuit 29 in condition for operation whenever the focus control circuit 27 generates the in-focus signal. A well known shutter release mechanism 30 is activated by operation of the shutter release circuit 29 to drive a shutter.

Figure 7:
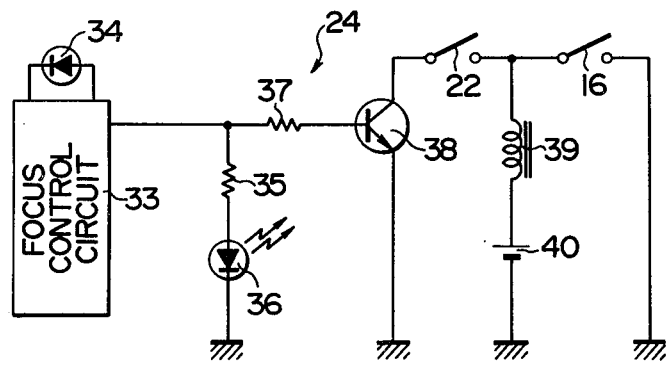
FIG. 7 is a circuit diagram illustrating an embodiment of electrical circuit in FIG. 6.

A practical wiring circuit of the focus detecting camera is shown in FIG. 7. A focus control circuit 33 of the focus detector 24 includes the arithmetic circuit 26 and the focus control circuit 27 in FIG. 6, at the input terminals of which is connected a photosensitive unit 34 which constitutes the focus detecting sensor 25 in FIG. 6 and which includes a plurality of photoelectric transducers arranged in a single array or in parallel. The output terminal of the focus control circuit 33 is connected through a resistor 35 to the anode of a light emitting member 36 which constitutes the in-focus indicator 28 in FIG. 6 and includes an LED or the like. The cathode of the light emitting member 36 is connected to the ground. The output terminal of the focus control circuit 33 also is connected through a resistor 37 to the base of an NPN transistor 38 which constitutes an automatic release switching circuit which is brought into operation in response to the in-focus signal from the focus control circuit 33. The transistor 38 has its emitter connected to the ground and its collector connected to one terminal of the switch 22. The other terminal of the switch 22 is connected through an electromagnetic coil 39 of a release type electromagnet (not shown) for a shutter release disposed within the shutter release circuit 29 in FIG. 6, to a positive terminal of a power supply battery 40 as well as to one terminal of the switch 16. Both the negative terminal of the battery 40 and the other terminal of the switch 16 are connected to the ground.

With the focus detecting camera of the invention constructed as stated above, the automatic release operation responsive to an in-focus detection output will be described with reference to FIGS. 3 through 7. FIGS. 6 and 7 represent the condition corresponding to FIG. 3 before the shutter release button 17 is operated. Specifically, the shutter release button 17 under its free condition is in the raised position so that both the automatic release switch 22 and the electromagnetic release switch 16 are in open condition. Under this condition, assuming that an object to be photographed is at a desired distance, the distance is previously set by moving the taking lens 2 (see FIG. 1) back and forth to focus on the object at the distance position. To this end, the desired distance may be simply preset employing a distance ring of the camera as well as a stationary object adjacent to the distance position to focus thereon.

Thereupon, the taking lens 2 is fixed after the desired distance is preset and the camera is also fixed pointing to the desired distance position. Then slightly depressing the shutter release button 17 and in turn keeping thus partially depressed condition thereof (see FIG. 4), the photographer may wait for a moving object to be photographed to reach the preset distance position. The automatic release switch 22 is closed since the shutter release button 17 is in the partially depressed condition. At this time the shutter release circuit 29 in FIG. 6 is ready to be operated in response to the in-focus signal from the in-focus control circuit 27. Specifically, when the switch 22 is closed, the circuit including battery 40—coil 39—switch 22—transistor 38 in FIG. 7 is closed to be ready for rendering the transistor 38 conductive in response to the in-focus signal output from the focus control circuit 33. As long as the moving object to be photographed is out of the preset distance position, that is an out-of-focus condition, the output of the focus control circuit 33 is in the "low" level so that the light emitting member 36 is not activated and the transistor 38 is in the non-conducting state. When the object reaches the preset distance position, and is, therefore, in the in-focus state, the focus control circuit 33 detects the in-focus state, whereupon the output thereof becomes the "high" level. At this time, the light emitting member 36 is activated to display the in-focus state and to render the transistor 38 conductive. The conduction of the transistor 38 causes an electric current to flow in the circuit including battery 40—coil 39—switch 22—transistor 38 so that the electromagnetic coil 39 is energized. Thereupon, the shutter is released through the shutter release mechanism 30 including the release type electromagnet with the coil 39 and thus a picture is taken. It will be seen that the shutter is automatically released and a picture is taken under the precisely in-focus condition when the moving object reaches the distance position by only keeping the shutter release button 17 in the partially depressed condition after the taking lens 2 is fixed so that the moving object reaches the in-focus condition.

When it is desired to take a picture using a normal manual shutter release without the focus detector 24 as described above, the shutter release button 17 may be depressed through its full stroke to close the electromagnetic release switch 16. At this time, the shutter release circuit 29 operates independently of the output from the focus control circuit 27 (33). Specifically, when the switch 16 is closed, a current flows through the circuit including battery 40—coil 39—switch 16 to energize the electromagnetic coil 39. As a result, the shutter release mechanism 30 operates so that the shutter is released and a picture is taken.

The focus detecting camera of the invention can be applied to not only the electromagnetic release type cameras described above but also non-electromagnetic release type cameras.

Figure 8:
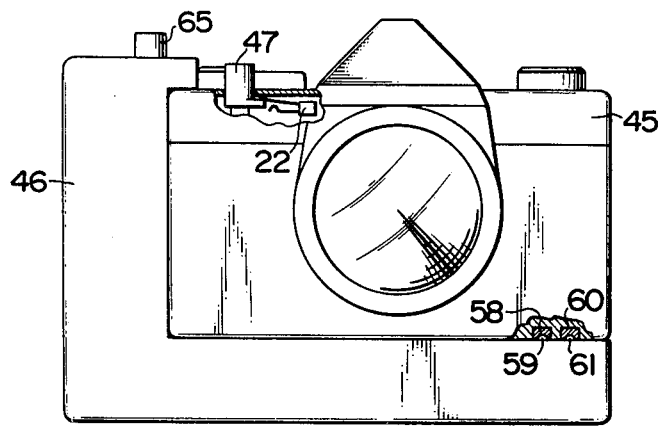
FIG. 8 is a front view of a focus detecting camera illustrating another embodiment of the invention.
Figure 9:
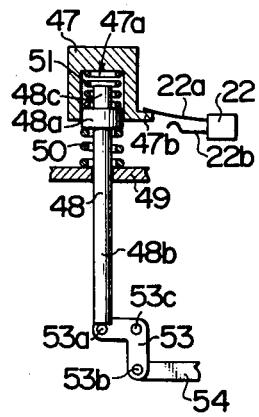
FIG. 9 is a sectional view illustrating structure including a shutter release button and its surroundings of the focus detecting camera in FIG. 8.

In FIG. 8, which is a front view of a focus detecting camera of another embodiment of the invention, a motor drive unit 46 is attached to a non-electromagnetic release type camera 45. A mechanism in cooperation with a shutter release button 47 of camera 45 is constructed as shown in FIG. 9. Specifically, the structure is the same as that shown in FIG. 3 in which a first coiled spring 50 is interposed between a flange portion 48a of a release member 48 which is operated by the release button 47 and a stationary member 49 and a second coiled spring 51 whose resilience force is weaker than that of the first spring 50 is interposed between the flange portion 48a and the upper bottom surface of an inner cavity 47a of the release button 47. The release button 47 and the release member 48 are normally in their raised positions. A movable contact piece 22a of the automatic release switch 22 is locked by a protrusion 47b provided on the release button 47. Consequently, when the release button 47 is in its free condition, the switch 22 is open as shown in FIG. 9. A release portion 48b of release member 48 extends downward within the camera 45. The lower end of the release portion 48b bears against a pin 53a fitted into one end of a release lever 53. The release lever 53 is formed in an inverse L shape and is secured to a stationary member by means of a support pin 53c. The other end of the release lever 53 is connected through a connecting pin 53b to a release member 54 which releases a shutter directly.

Figure 10:
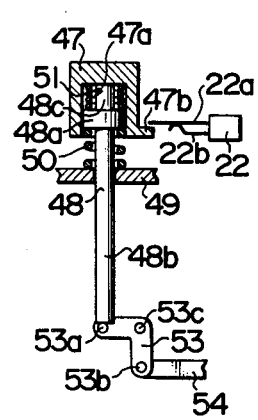
FIG. 10 is a sectional view of the shutter release button in FIG. 9 under its partially depressed condition.
Figure 11:
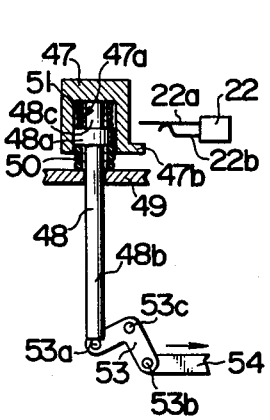
FIG. 11 is a sectional view of the shutter release button in FIG. 9 under its full-stroke depressed condition.

When the shutter release button 47 is depressed into a partially depressed condition in the same manner described in the previously described embodiment, only the second spring 51 is compressed so that only the release button 47 is lowered to move back the movable contact piece 22a of the switch 22 without the release member 48 being moved. Thus the switch 22 is closed as shown in FIG. 10. When the release button 47 is depressed further, the protrusion 48c of the release member 48 bears against the upper bottom surface of the inner cavity 47a of the release button 47. Thereafter, as shown in FIG. 11, the first spring 50 is also compressed and both release button 47 and release member 48 are integrally lowered. At this time, the release lever 53 is rotated counterclockwise by the release portion 48b to move the release member 54 in the right direction as shown with the arrow, thereby releasing the shutter.

Figure 12:
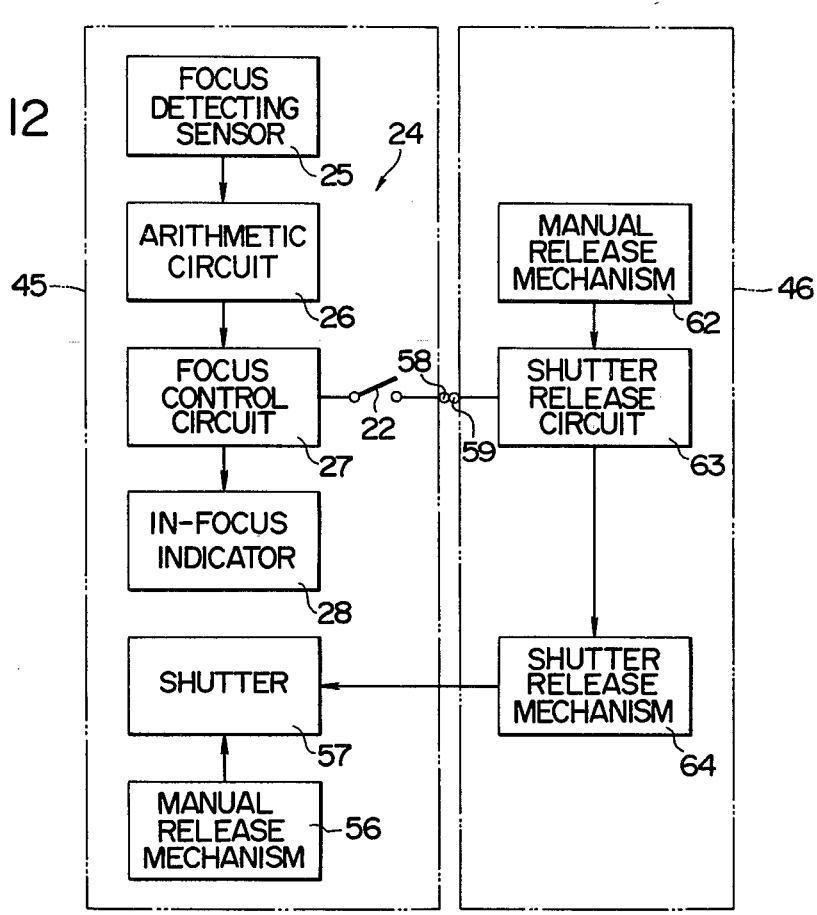
FIG. 12 is a block diagram illustrating structure and actions of the focus detecting camera in FIG. 8.

FIG. 12 is a schematic diagram of the structure in which the camera shown in FIG. 8 is combined with a motor drive unit 46. As in the previously described embodiment, the focus detector 24 (including focus detecting sensor 25, arithmetic circuit 26, focus control circuit 27 and in-focus indicator 28) is provided within the camera 45. A shutter 57 is driven by a manual release mechanism 56 which includes shutter release button 47, release member 48, release lever 53 and release member 54 (see FIG. 9).

The output terminal of the focus control circuit 27 is connected through the automatic release switch 22 to a contact 58 to which the motor drive unit 46 is connected. The contact 58 comes in contact with a contact 59 of the motor drive unit 46 when the latter is mounted on the camera 45, with the result that the contact 58 is connected to a shutter release circuit 63 of the motor drive unit 46. In FIG. 8, a contact 60 of the camera 45 is connected to a contact 61 of the motor drive unit 46, both contacts acting as ground terminals. The shutter release circuit 63 is to be operated primarily by a manual release mechanism 62 including a shutter release button 65 (FIG. 8) of the motor drive unit 46. When the shutter release circuit 63 is operated, a shutter drive motor is activated to operate a shutter release mechanism 64. The shutter release mechanism 64 is coupled to drive a shutter 57 of the camera 45.

Figure 13:
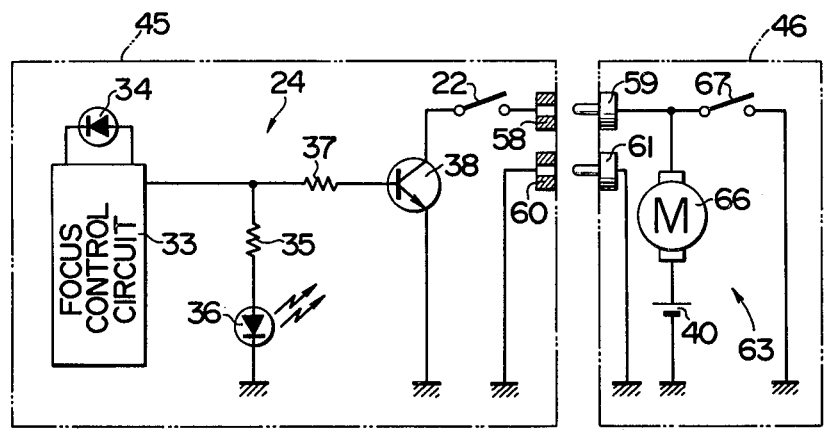
FIG. 13 is a circuit diagram illustrating an embodiment of electrical circuit in FIG. 12.

An electrical circuit for the combination of the focus detecting camera and the motor drive unit in FIG. 12 is as shown in FIG. 13. Specifically, the focus detector 24 is provided within the camera 45 in a similar manner as in FIG. 7. The collector of transistor 38, which serves as a switching circuit for the automatic release and which is provided on the output side of the focus detecting apparatus 24, is connected through the automatic release switch 22 to the contact 58. On the side of motor drive unit 46, the contact 59 is connected to the negative terminal of a motor 66 as well as one end of a release switch 67 which cooperates with the shutter release button 65 of the motor drive unit 46. The positive terminal of the motor 66 is connected to the positive terminal of the power supply battery 40. The negative terminal of the battery 40 and the other terminal of the release switch 67 are connected to ground. That is, the shutter release circuit 63 is comprised of battery 40, motor 66 and release switch 67. The connecting contacts 60 and 61 are grounded through the camera 45 and the motor drive unit 46, respectively.

As described above, the focus detecting camera of the non-electromagnetic release type and the motor drive unit are constructed so that when the motor drive unit 46 is mounted on the camera 45 the contacts 58 and 59 as well as the contacts 60 and 61 are connected. As a result, the focus detector 24 within the camera 45 is connected through the automatic release switch 22 to the shutter release circuit 63 of the motor drive unit 46.

In order to release the shutter automatically when a moving object being photographed reaches a position at a preset distance, the photographer partially depresses the shutter release button 47 to close the automatic release switch 22. When the object reaches the preset distance, the focus control circuit 33 produces the in-focus signal so that the light emitting member 36 is lighted by the in-focus signal and simultaneously the transistor 38 is rendered conductive. Thereupon, a current flows through the path including battery 40—motor 66—contact 59—contact 58—switch 22—transistor 38—contact 60—contact 61 to drive the motor 66. As a result, the shutter release mechanism 64 operates to release the shutter 57 of the camera 45 for taking a picture.

When a normal shutter release operation is performed using the motor drive unit 46, the shutter release button 65 thereof is operated and thereby the release switch 67 is closed. Hence a current flows through the path including—motor 66—release switch 67—battery 40 to drive the motor 66. Then the shutter release mechanism 64 is operated in the same manner as in the above to release the shutter 57 of the camera 45.

What is claimed is:

1. A focus detecting camera, comprising:
   (A) an automatic focus detector for generating an in-focus detection signal when a moving object to be photographed reaches an in-focus position which is a preset distance from said camera;
   (B) a human actuable switch which may be actuated by a user of said camera whenever said camera is to be operated in a moving object focus mode; and
   (C) shutter release means for releasing a shutter of said camera whenever said human actuable switch is actuated and said automatic focus detector generates said in-focus detection signal.

2. A focus detecting camera according to claim 1 in which said automatic focus detector comprises a sensor for focus detection, an arithmetic circuit responsive to the output from said sensor, and a focus control circuit for generating an in-focus detection signal in response to the output from said arithmetic circuit.

3. A focus detecting camera according to claim 1, in which said shutter release button mechanism comprises a shutter release button, a release member which is lowered by said shutter release button when said release button is depressed, a first coiled spring for biasing said release member upward to a first position and a second coiled spring which has a weaker resilience force than that of said first spring located between said release button and said release member, said second coiled spring biasing said shutter release button upward to a second position; and wherein said switch means is activated and only said second spring is compressed when said shutter release button is partially depressed and said first coiled spring is compressed as said shutter release button is depressed further.

4. A focus detecting camera according to claim 2, in which said shutter release button is formed in the shape of a cap and has a protrusion for actuating said switch means located at a peripheral portion thereof, an inner cavity off said cap-shaped release button receiving a flange portion of said release member, said second spring being interposed between the upper surface of said flange portion and the upper bottom surface of said inner cavity, said release member further including a protrusion formed on the central upper surface of said flange portion for limiting the distance said shutter release button can be depressed relative to said release member.

5. A focus detecting camera according to claim 4, in which said first coiled spring is interposed between said flange portion of said release member and a stationary member of said camera.

6. A focus detecting camera according to claim 1, wherein said human actuable switching comprises:
a shutter release button mechanism movable between a fully extended and a fully depressed position; and
switch means associated with said shutter release button mechanism and being actuated when said shutter release button mechanism is partially depressed.

7. A focus detecting camera according to claim 6, wherein said shutter release means also releases said shutter of said camera wheneer said shutter release button is sufficiently depressed that said release member has been lowered to a second position below said first position.

8. A focus detecting camera according to claim 7, in which said shutter release means is associated with a mechanical release type shutter.

9. A focus detecting camera according to claim 7, in which said shutter release means is associated with a shutter release circuit of a motor drive unit which is mounted on a non-electromagnetic release camera and wherein said shutter release circuit is activated when said release member is in said predetermined position.

10. A focus detecting camera according to claim 6, in which said switch means is a normally closed switch and is actuated when it is placed in an open state by said shutter release button.

11. A focus detecting camera according to claim 7, in which said shutter release means comprises a switch associated with an electromagnetic release type shutter and wherein said switch is actuated by said release member when said release member is in said second position.

12. A focus detecting camera, comprising:
(A) an automatic focus detector for generating an in-focus detection signal when a moving object to be photographed reaches an in-focus position which is a preset distance from said camera;
(B) a shutter release button mechanism movable between a fully extended and a fully depressed position;
(C) first switch means associated with said shutter release button and being actuated when said shutter release button is in a partially depressed position;
(D) second switch means associated with said shutter release button and being actuated when said shutter release button is in said fully depressed position; and
(E) shutter release means for releasing a shutter of said camera whenever either of the following conditions is met:
(1) both said first switch means is actuated and said automatic focus detector generates said in-focus signal; or
(2) said second switch means is actuated.

13. A focus detecting camera according to claim 12, wherein said first switch means is a normally closed switch and is actuated when it is placed in an open state by said shutter release button.

* * * * *